US010887522B2

(12) United States Patent
Maruhashi

(10) Patent No.: US 10,887,522 B2
(45) Date of Patent: Jan. 5, 2021

(54) IMAGING APPARATUS AND CONTROL METHOD

(71) Applicant: CANON KABUSHIKI KAISHA, Tokyo (JP)

(72) Inventor: Naoka Maruhashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 9 days.

(21) Appl. No.: 16/192,898

(22) Filed: Nov. 16, 2018

(65) Prior Publication Data

US 2019/0158748 A1 May 23, 2019

(30) Foreign Application Priority Data

Nov. 22, 2017 (JP) .................................. 2017-224597

(51) Int. Cl.
*H04N 5/232* (2006.01)

(52) U.S. Cl.
CPC ....... *H04N 5/23287* (2013.01); *H04N 5/2328* (2013.01); *H04N 5/23241* (2013.01); *H04N 5/23254* (2013.01); *H04N 5/23258* (2013.01); *H04N 5/23267* (2013.01); *H04N 5/23299* (2018.08); *H04N 5/232411* (2018.08)

(58) Field of Classification Search
CPC ........... H04N 5/23287; H04N 5/23267; H04N 5/23258; H04N 5/23299; H04N 5/232411; H04N 5/23254; H04N 5/2328; H04N 5/23241
See application file for complete search history.

(56) References Cited

U.S. PATENT DOCUMENTS

| 2009/0028537 A1* | 1/2009 | Tamura .................. G03B 17/00 396/55 |
| 2011/0157381 A1 | 6/2011 | Miyasako |
| 2014/0002679 A1 | 1/2014 | Ikeda |
| 2016/0127646 A1* | 5/2016 | Osborne .............. H04N 5/2251 348/208.2 |
| 2017/0118410 A1* | 4/2017 | Karlsson Jagerman ..................... H04N 5/2253 |

(Continued)

FOREIGN PATENT DOCUMENTS

| JP | 2005-258034 A | 9/2005 |
| JP | 2010-283598 A | 12/2010 |

(Continued)

OTHER PUBLICATIONS

The above patent document was cited in a European Partial Search Report dated Apr. 15, 2019, that issued in the corresponding U.K. Patent Application No. 18203044.5.

(Continued)

*Primary Examiner* — Yogesh K Aggarwal
(74) *Attorney, Agent, or Firm* — Cowan, Liebowitz & Latman. P.C.

(57) ABSTRACT

A drive unit configured to pan-tilt drive an optical imaging system, and a system control unit configured to control a correction amount of the image stabilization by driving the drive unit are provided in the imaging apparatus, wherein the system control unit changes the correction amount depending on at least one of total power of the imaging apparatus, an amplitude of a motion of the imaging apparatus, a frequency of the motion, a shutter speed, and the number of drive times of the drive unit.

19 Claims, 11 Drawing Sheets

(56) References Cited

U.S. PATENT DOCUMENTS

2017/0227162 A1* 8/2017 Saika .................. F16M 11/121
2018/0173079 A1* 6/2018 Wakamatsu ........... H04N 5/232

FOREIGN PATENT DOCUMENTS

JP  2012-220769 A  11/2012
WO  2016/194307 A1  12/2016

OTHER PUBLICATIONS

The above patent document were cited in a European Search Report dated Aug. 8, 2019, which is unclosed that issued in the corresponding European Patent Application No. 18203044.5.

* cited by examiner

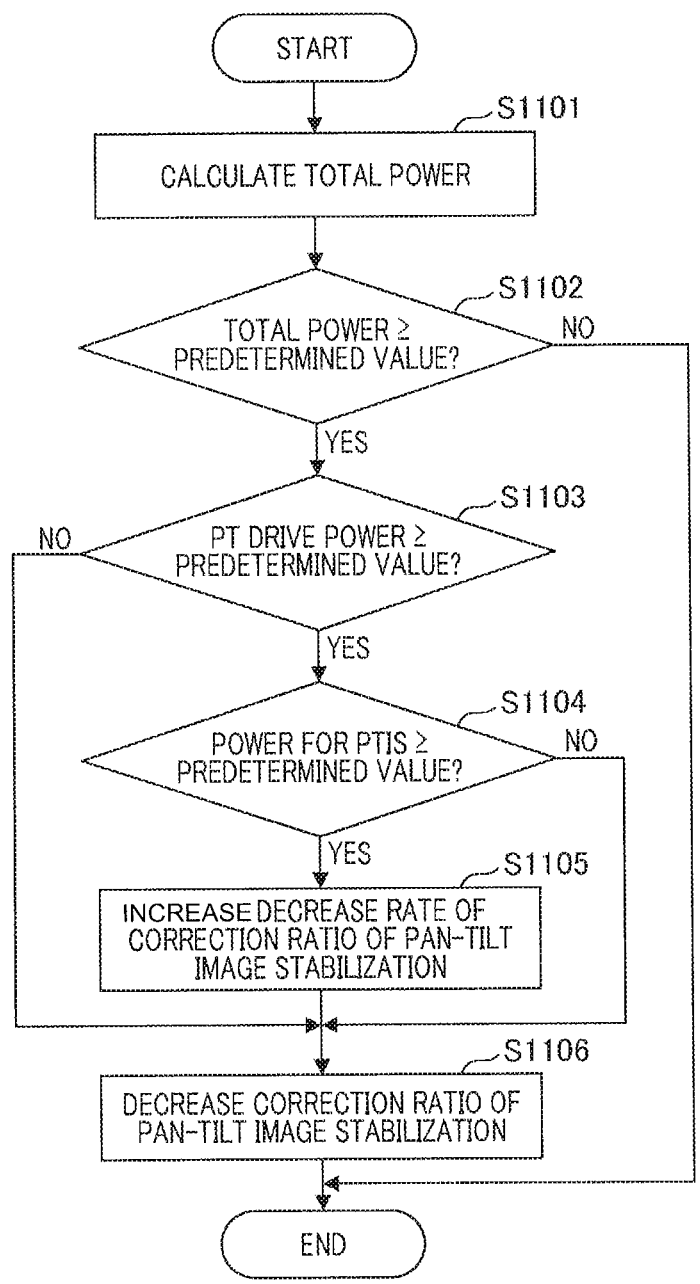

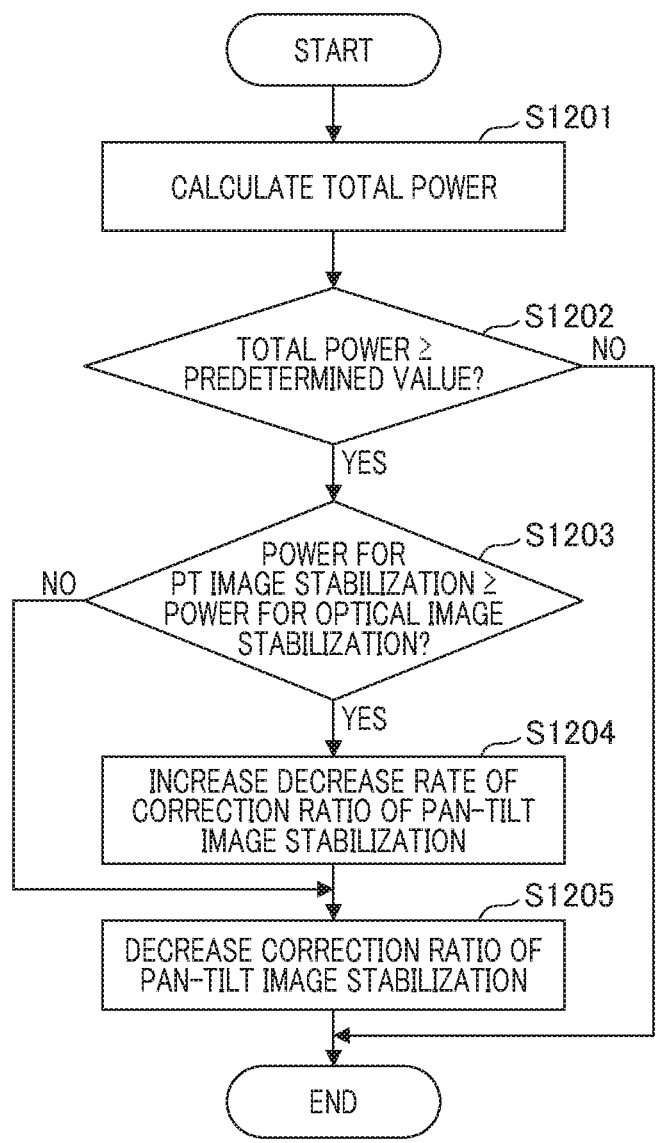

IMAGING APPARATUS AND CONTROL METHOD

BACKGROUND OF THE INVENTION

Field of the Invention

The present invention relates to an imaging apparatus.

Description of the Related Art

Recently, imaging apparatuses such as stationary type security cameras have become widely used. Those stationary type security cameras are often equipped with an IS (image stabilization) mechanism for correcting image blur caused by vibration of an environment where the cameras are installed. Among IS methods, there is an optical IS method where a lens is correctively moved with respect to an optical axis thereof. Another method is an electronic IS that calculates an amount of motion between sequential images, which are obtained from an image sensor or a video source, and varies a trimming area of each image data stored in a memory according to the amount of motion. However, since an angle range within which such an optical IS using a lens or an electronic IS can stabilize images is relatively narrow if those security cameras are installed on a ship or used on the sea, stabilization effect is not obtained when waves are big. Therefore, a Pan-Tilt image stabilization method which drives Pan-Tilt mechanisms for IS is effective.

It generally takes about 4 Watts to drive the Pan-Tilt mechanism. According to the standard on the PoE (Power Over Ethernet), which is suitable for stationary security cameras, the limitation of power for driving external apparatuses is 12.95 Watts in 48 Volts. Therefore, the power for driving the Pan-Tilt mechanism consumes large part of PoE power limit. Japanese Patent Application Laid-Open No. 2005-258034 discloses a technique that detects an amount of load applied to a rotation control unit installed in an electrically driven camera platform and variably controls an amount of power supply depending on the amount of load. In addition, Japanese Patent Application Laid-Open No. 2010-283598 discloses a technique that can reduce power consumption by changing the power supply status of motors depending on whether a camera platform is driven or not.

However, the above Japanese Patent Application Laid-Open No. 2005-258034 does not discloses neither the total power consumption of the imaging apparatus having plural drive systems nor power consumption of the Pan-Tilt mechanism, so that some functions may not stably work when total power consumption increases, or power shortage may happen when the apparatus is suddenly driven. The Japanese Patent Application Laid-Open No. 2010-283598 similarly does not disclose total power consumption of the imaging apparatus having plural drive systems. In addition, since motors are stopped in response to On or Off, although selection of On or Off of IS may be possible, the IS effect cannot be obtained when power is low.

SUMMARY OF THE INVENTION

One of the aspects of the present invention is to provide an imaging apparatus having a Pan-Tilt mechanism that can achieve both low power consumption and an accurate IS.

The imaging apparatus according to the present invention includes a driving unit configured to pan driving and tilt driving of an imaging optical system, a control unit configured to control a correction amount of the image stabilization by driving the driving unit, wherein the control unit changes the correction amount of the image stabilization depending on a total power consumption of the imaging apparatus.

Further features of the present invention will become apparent from the following description of exemplary embodiments with reference to the attached drawings.

BRIEF DESCRIPTION OF THE DRAWINGS

FIG. 11 is a flowchart illustrating a process for changing correction ratio of Pan-Tilt image stabilization.

FIG. 12 is a flowchart illustrating a process for changing correction ratio of Pan-Tilt image stabilization.

DESCRIPTION OF THE EMBODIMENTS

Figure 1:
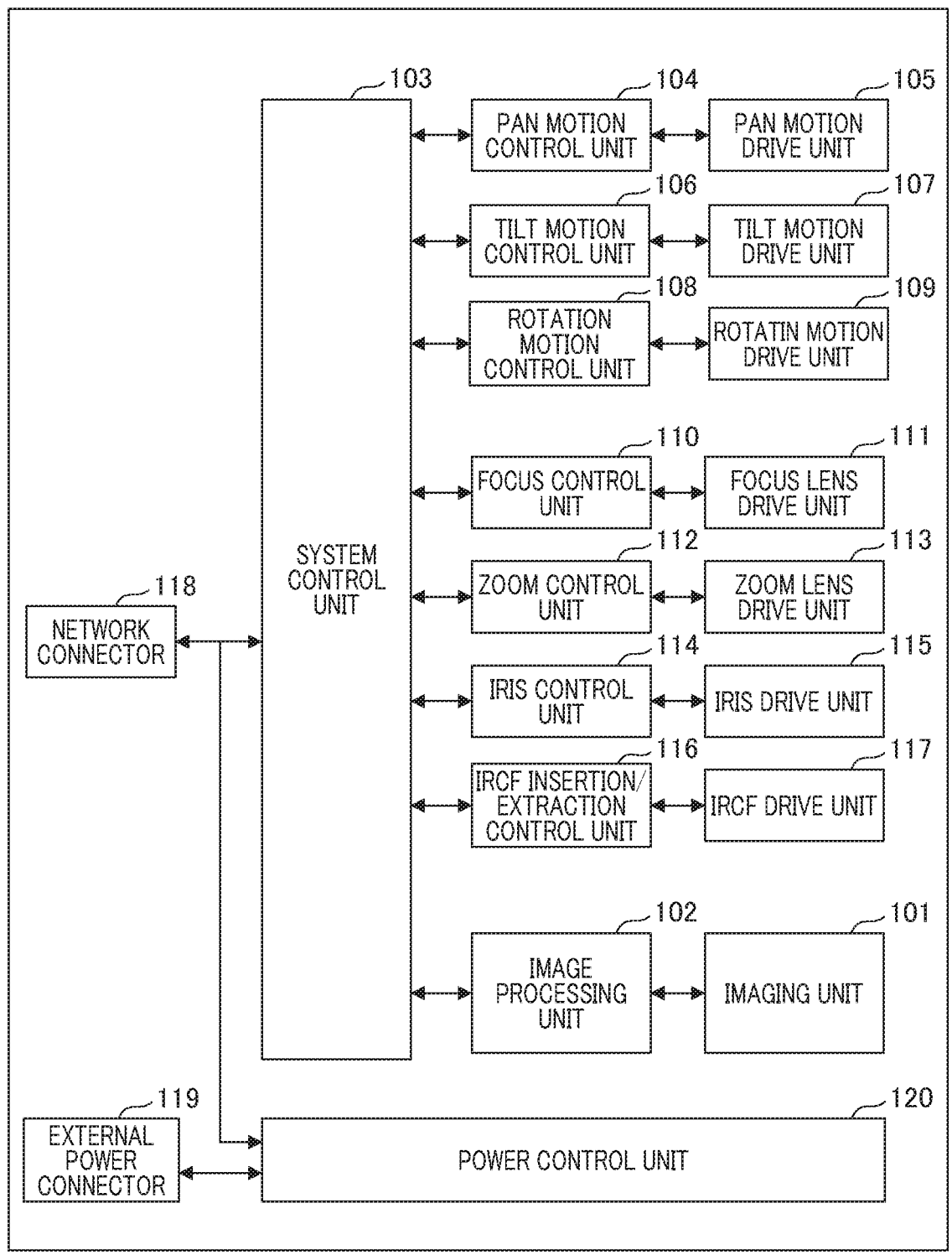
FIG. 1 is a diagram illustrating a configuration example of an imaging apparatus.

FIG. 1 is a diagram illustrating an imaging apparatus. The imaging apparatus according to this embodiment is, for example, a network camera, such as a security camera, capable of communicating with other devices through a network. The imaging apparatus includes an imaging unit 101, an image processing unit 102, a system control unit 103, a pan motion control unit 104, a pan motion drive unit 105, a tilt motion control unit 106, a tilt motion drive unit 107, a rotation motion control unit 108, and a rotation motion drive unit 109. The imaging apparatus further includes a focus control unit 110, a focus lens drive unit 111, a zoom control unit 112, a zoom lens drive unit 113, an IRIS control unit 114, an IRIS drive unit 115, an IRCF insertion/extraction control unit 116, and an IRCF drive unit 117. The imaging apparatus further includes a network connector 118, an external power connector 119, and a power control unit 120.

The imaging unit 101 includes a lens and an image pickup device for optical imaging, and photoelectric conversion units included in the image pickup device convert the optical image of photographic subject into electric signals. The image signals are generated by imaging and photoelectric converting in the imaging unit 101, executed a predetermined image processing in an image processing unit 102 and transmitted to a system control unit 103. Note that the image may either be a still image or a video image. The system control unit 103 converts image signals transmitted from the image processing unit 102 to network signals and then delivers them to the network through the network connector 118. The system control unit 103 receives control commands transmitted from client apparatuses through the network. In response to received commands, the system control unit 103 controls each of a focusing motion, a zoom motion, an IRIS control, IRCF insertion/extraction motion, a pan motion, a tilt motion, and a rotation motion by transmitting respective motion commands to corresponding motion control units. Each motion control unit respectively controls a corresponding motion drive unit based on the transmitted motion commands.

The pan motion drive unit 105 includes a drive mechanism for performing a pan driving (i.e. a panning motion) and a motor serving as a driving source, which is controlled by the pan motion control unit 104. The tilt motion drive unit 107 includes a drive mechanism for performing a tilt driving (i.e. tilting motion) and a motor serving as a driving source, which is controlled by the tilt motion control unit 106. The rotation motion drive unit 109 includes a drive mechanism for performing the rotation motion and a motor serving as a driving source, which is controlled by the rotation motion control unit 108.

The focus lens drive unit 111 includes a drive mechanism for performing the rotation operation and a motor serving as a driving source, which is controlled by the rotation drive control unit 110. The zoom lens drive unit 113 includes a drive mechanism for performing the zooming operation and a motor serving as a driving source, which is controlled by the zoom control unit 112. The IRIS drive unit 115 includes a drive mechanism for performing the aperture adjustment of IRIS (i.e. diaphragm) and a motor serving as a driving source, which is controlled by the IRIS control unit 114. The IRCF drive unit 117 includes a drive mechanism for inserting/extracting an IRCF (Infrared Cut Filter) and a motor serving as a driving source, which is controlled by the IRCF insertion/extraction control unit 116.

The imaging apparatus is connected to the network such as a LAN through the network connector 118, and can communicate with a plurality of client apparatuses (i.e. information processing apparatuses). The client apparatus can display and record images taken by the imaging apparatus via the network. The client apparatuses can transmit the control commands to the imaging apparatus to control settings, a focus motions, a zoom motions, a pan motions, a tilt motions, and an insertion/extraction motions of the IRCF, etc. of the imaging apparatus.

The imaging apparatus can be supplied power from a PoE (Power on Ethernet) power source through a LAN cable connected to the network connector 118. The imaging apparatus can also receive power from an external power source such as an AC adapter or a general-purpose power source. The power supplied from the PoE power source or the external power source is converted to various voltages by the power control unit 120 and is delivered to each unit of the imaging apparatus.

Figure 2:
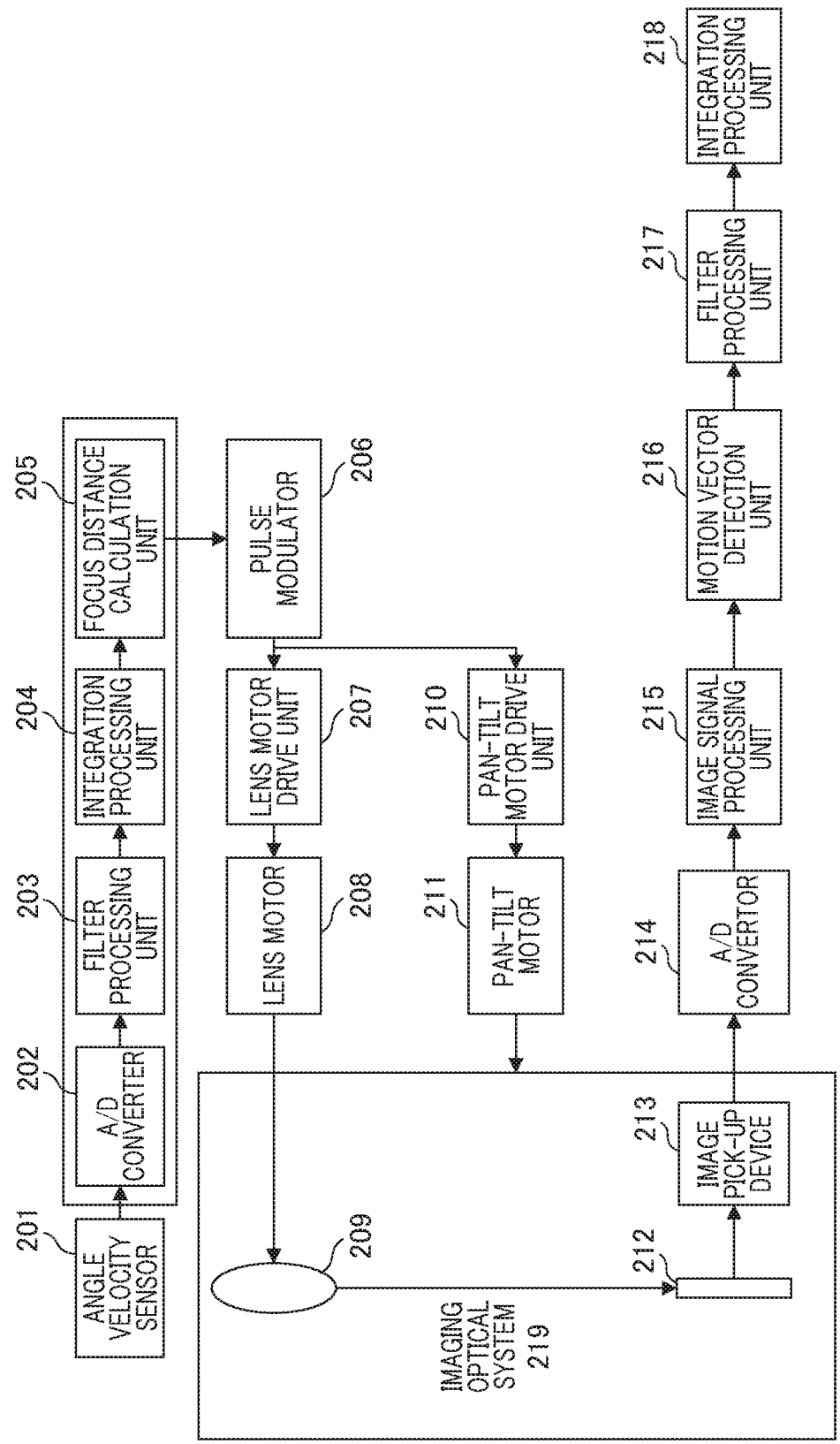
FIG. 2 is a diagram illustrating a configuration example of an image stabilization mechanism.

FIG. 2 is a diagram illustrating a mechanism for correcting image blur included in the imaging apparatus. The imaging apparatus includes a mechanism for detecting motions and a mechanism for stabilizing blurring of an image. As image stabilization methods, the Pan-Tilt image stabilization, the optical image stabilization, and the electronic image stabilization can be performed.

A angle velocity sensor 201 detects a motion of the imaging apparatus as an angle velocity signal. An A/D converter 202 converts the detected angle velocity signal into a digital signal. A filter processing unit 203 filters the digital signal output from the A/D converter 202 with a predetermined frequency band using a HPF (High-Pass Filter) or a LPF Low-Pass Filter). An integration processing unit 204 calculates an amount of motion by integrating the digital signal filtered by the filter processing unit 203. A focus distance calculation unit 205 converts the amount of motion into a correction amount which corresponds to a focus distance. A pulse modulation unit 206 converts the correction amount calculated by the focus distance calculation unit 205 into a PWM (Pulse Width Modulation) waveform and outputs it to a lens motor drive unit 207. The lens motor drive unit 207 drives the lens motor 208 on the basis of the PWM waveform outputted by the pulse modulation unit 206. A shift lens 209 of the imaging optical system 219 is shifted by the drive of the lens motor 208 so that a light beam is properly adjusted with regard to an optical axis, and thereby the motion of the image is optically corrected The PWM waveform modulated by the pulse modulation unit 206 is also outputted to the Pan-Tilt motor drive unit 210. The Pan-Tilt motor drive unit 210 drives the Pan-Tilt motor 211 based on the PWM waveform output by the pulse modulation unit 206. According to the drive of the Pan-Tilt motor 211, the imaging optical system including the lens and the image sensor moves in a Pan-Tilt direction so that the motion of the image is corrected.

On the image pickup device 213, a light beam passing through the shift lens 209 and other lenses is focused. Here, other lenses include a focus lens for focusing on an object and a zoom lens for adjusting an angle of view. The light beam passes through the lenses to enter into a camera also passes through an optical filter 212 such as the infrared cut filter and then enters the image pickup device 213.

An image focused on the image pickup device 213 is converted into an analog image signal by the photoelectric conversion unit included in the image sensor 213. An A/D converter 214 converts the analog image signals into digital image signals.

An image signal processing unit 215 performs a predetermined processing on the digital image signals output from the A/D converter 214 to output a luminance signal and chrominance signals for each pixel. The image processing unit 215 generates image signals to be output, and also generates parameters to be used for controlling the diaphragm and the adjustment of the focus.

A motion vector detection unit 216 detects an amount of a motion vector by taking difference between plural image signals. A filter processing unit 217 executes a filtering to allow passing through of the amount of a motion vector within a predetermined frequency band. An integration processing unit 218 integrates the amount of motion vectors filtered by the filter processing unit 216 to calculate an amount of motion correction. By changing a position of a trimmed image based on the amount of motion correction, an image whose motion is electronically stabilized is output.

First Embodiment

Figure 3:
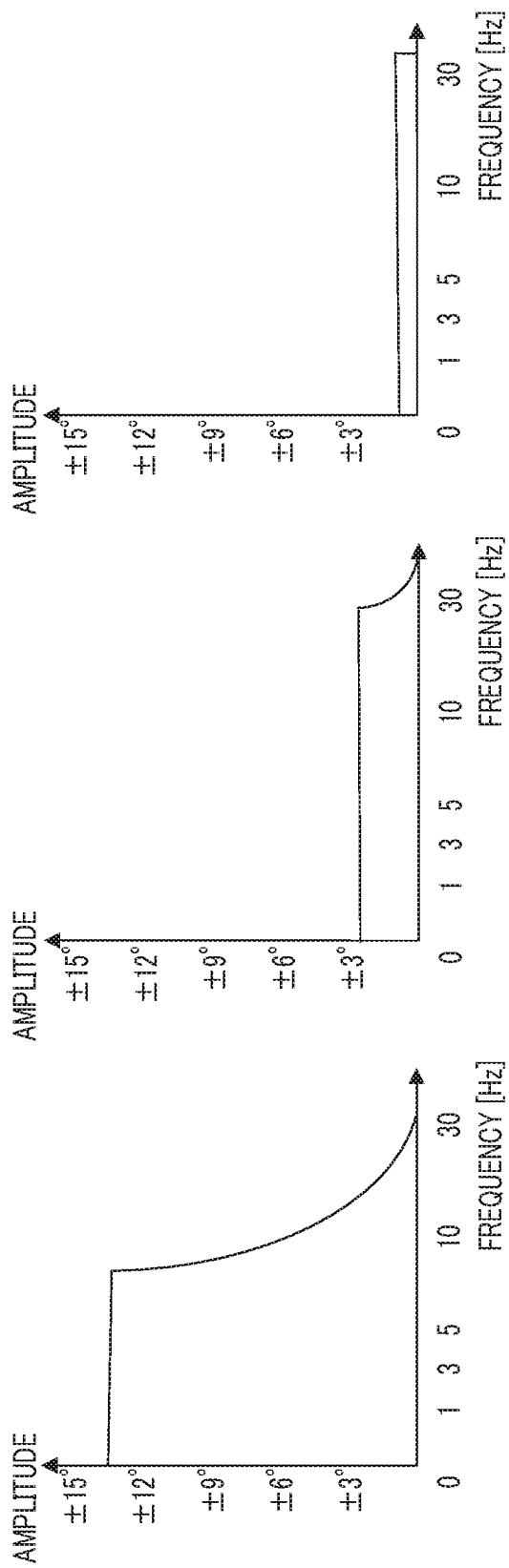
FIGS. 3A to 3C are diagrams illustrating exemplary amplitudes correctable by various image stabilization methods.

Each of the Pan-Tilt image stabilization, the optical image stabilization, and the electronic image stabilization used in this embodiment respectively has a suitable correction angle, a suitable correction frequency, and a suitable scene. FIGS. 3A to 3C are diagrams illustrating exemplary amplitudes correctable by various image stabilization methods. In FIGS. 3A to 3C, the horizontal axes denotes the frequency and the vertical axes denotes the amplitude.

FIG. 3A is a diagram illustrating an amplitude range correctable by the Pan-Tilt image stabilization. FIG. 3B is a diagram illustrating an amplitude range correctable by the optical image stabilization. FIG. 3C is a diagram illustrating an amplitude range correctable by the electronic image stabilization. As can be seen, the amplitude range correctable by the Pan-Tilt image stabilization is several times as wide as the amplitude range correctable by the optical stabilization. Although the Pan-Tilt image stabilization can stabilize images in a slow shutter speed. However, the image stabilization drive response drops as frequency increases and so the Pan-Tilt image stabilization cannot sufficiently correct the motion of an image in higher frequency, so that image stabilization cannot respond to the movement and image stabilization performance becomes worse.

In connection with the motions of high frequencies, the optical image stabilization has a better correction effect than that of the Pan-Tilt image stabilization. Furthermore, the optical image stabilization is not affected by the shutter speed and so can be used in a slow shutter speed. However, the optical image stabilization cannot fully stabilize motion of a large amplitude.

The electronic image stabilization is not affected by the frequency and so can stabilize motions with higher frequency than the optical image stabilization because it changes trimming positions of images without driving mechanical structures. However, the electronic image stabilization becomes worse with a slow shutter speed because images deletions are occurred in the slow shutter speed. In addition, in the electronic image stabilization, depending on image sensor size, correctable amplitude range is narrower than that of the optical image stabilization. As explained above, since each image stabilization method has respective characteristics with regard to amplitude of motions, frequencies of motions, and shutter speeds. Therefore, the image stabilization methods used in this embodiment are changed depending on the amplitude, the frequency, and the shutter speed. In addition, a correction ratio of the Pan-Tilt image stabilization is varied according to the amplitude, the frequency, and the shutter speed. In connection with this, the above image stabilization methods are selectively used or combined together depending on the situation.

Figure 4:
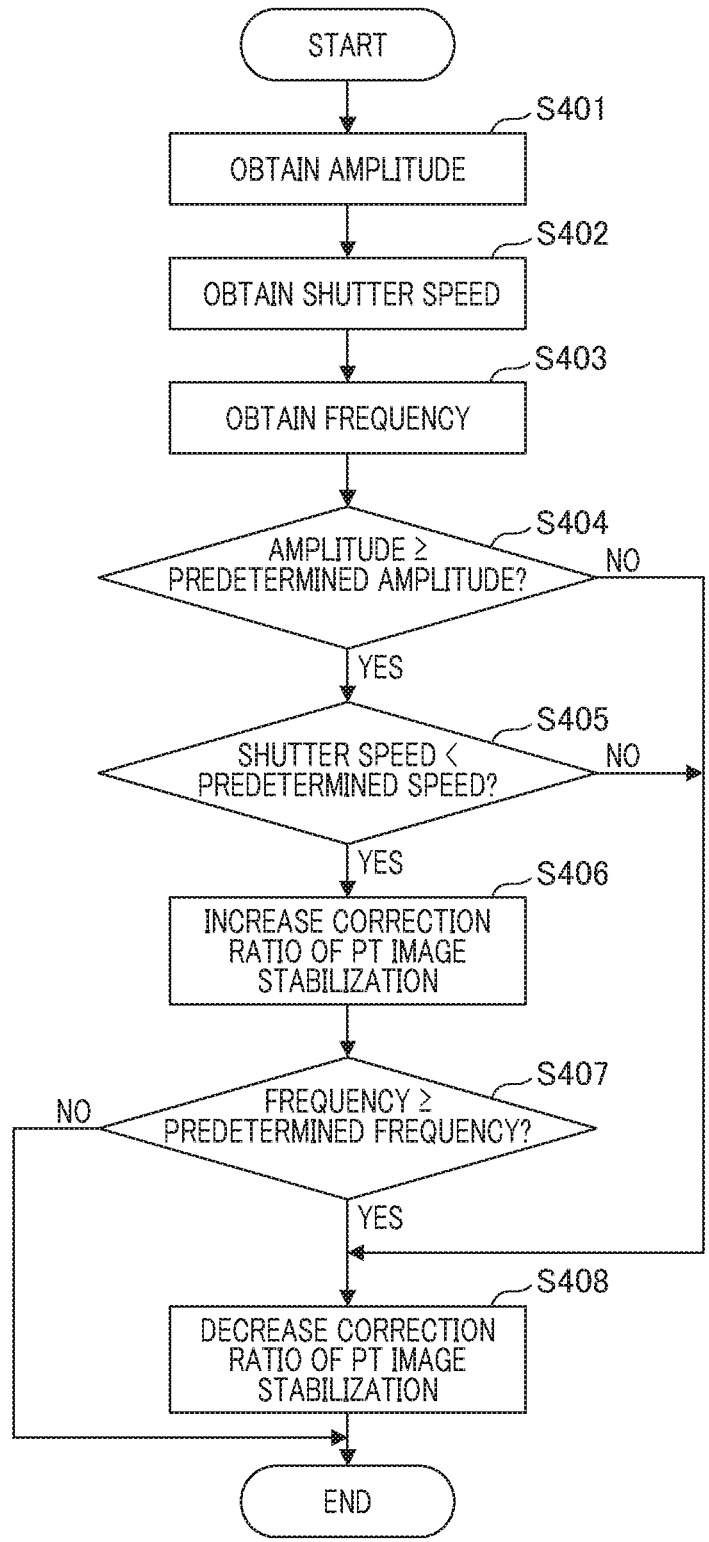
FIG. 4 is a flowchart illustrating a process for changing correction ratio of Pan-Tilt image stabilization.

FIG. 4 is a flowchart illustrating a process to change the correction ratio of the Pan-Tilt image stabilization. In FIG. 4, "PT" indicates "Pan-Tilt". Since the Pan-Tilt image stabilization consumes relatively large power, if the optical image stabilization or the electronic image stabilization can stabilize the motion of images accurately, it is preferable that the correction ratio of the Pan-Tilt image stabilization is reduced and so the usage of Pan-Tilt image stabilization is limited.

In S401, the system control unit 103 obtains the amplitude of a motion of the imaging apparatus based on the amount of motion detected by the angle velocity sensor 201. In S402, the system control unit 103 obtains the shutter speed at the time of imaging. In S403, the system control unit 103 obtains a frequency of motion based on motions detected by the angle velocity sensor 201.

In S404, the system control unit 103 judges whether the amplitude obtained in S401 is equal to or larger than a predetermined amplitude or not. If the amplitude is equal to or larger than the predetermined amplitude, the flow proceeds to S405. If the amplitude is smaller than the predetermined amplitude, the optical image stabilization or the electronic image stabilization can stabilize the motion of images accurately, so that the flow proceeds to S408.

In S405, the system control unit 103 judges whether the shutter speed obtained in S402 is slower than a predetermined shutter speed or not. If the shutter speed obtained in S402 is slower than the predetermined shutter speed, since the electronic image stabilization is affected by the image blur, the flow proceeds to S406. If the shutter speed is equal to or faster than the predetermined shutter speed, the flow proceeds to S408 because the electronic image stabilization can accurately stabilize images.

In S406, the system control unit 103 increases the correction ratio (that is, the amount of correction) of the Pan-Tilt image stabilization. That is, when the amplitude is large and the shutter speed is slow, it is necessary to increase the correction ratio of the Pan-Tilt image stabilization since the optical image stabilization and the electronic image stabilization cannot sufficiently stabilize the motion of images.

Figure 5:
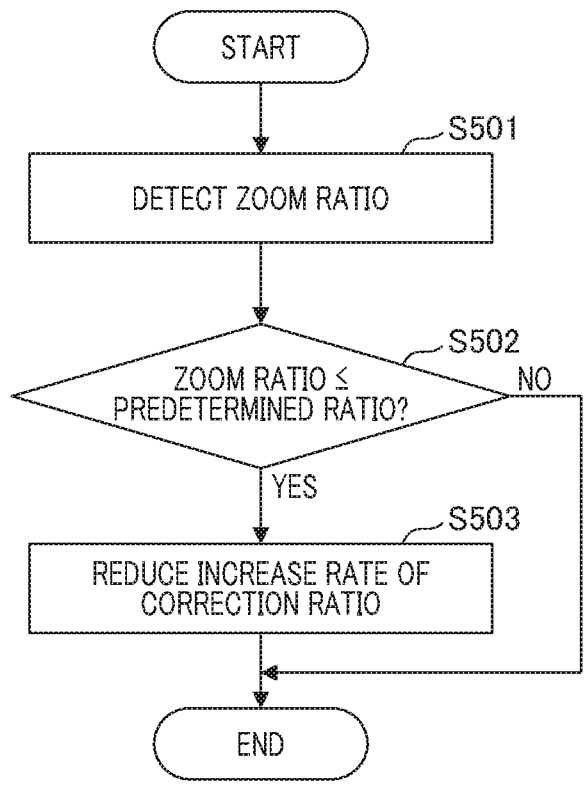
FIG. 5 is a flowchart illustrating a process for changing correction ratio depending on a zoom ratio.

When increasing the correction ratio of the Pan-Tilt image stabilization in S406, a zoom ratio may be taken into consideration. FIG. 5 is a flowchart illustrating a process to change the correction ratio of the Pan-Tilt image stabilization by using a zoom ratio. Processing shown in FIG. 5 may be applied when increasing the correction ratio of the Pan-Tilt image stabilization in S406. In S501, the system control unit 103 detects a zoom ratio. In S502, the system control unit 103 judges whether the zoom ratio detected in S501 is equal to or less than a predetermined zoom ratio or not. This is because amplitudes of motion in image will change depending on the zoom ratio. If the zoom ratio is equal to or less than the predetermined zoom ratio, the flow proceeds to S503. If the zoom ratio is larger than the predetermined zoom ratio, the flow in FIG. 5 ends. In S503, the system control unit 103 reduces the increase rate of the correction ratio of the Pan-Tilt image stabilization when increasing the correction ratio of the Pan-Tilt image stabilization in S406.

In S407, the system control unit 103 judges whether the frequency obtained in S403 is equal to or larger than a predetermined frequency or not. If the frequency is equal to or larger than the predetermined frequency, since the responsiveness of the Pan-Tilt image stabilization drops at higher frequencies, the flow proceeds to S408. On the contrary, if the frequency is smaller than the predetermined frequency, the correction ratio of the Pan-Tilt image stabilization is maintained as increased in S406, and then the flow in FIG. 4 ends.

In S408, the system control unit 103 decreases the correction ratio of the Pan-Tilt image stabilization. That is, if the amplitude of the motion is small or if the shutter speed is high, the optical image stabilization and the electronic image stabilization can accurately stabilize images, therefore the correction ratio of the Pan-Tilt image stabilization can be decreased. In addition, as illustrated in FIG. 3A, since the Pan-Tilt image stabilization effect drops at high frequencies, the correction ratio of the Pan-Tilt image stabilization can be decreased also at the high frequency. Furthermore, in the case where the amplitude is equal to or larger than an amplitude range correctable by the optical image stabilization and the frequency is equal to or larger than the predetermined frequency, that is, in the case of a large amplitude and a high frequency, it is possible to prevent the drop of responses at higher frequencies by executing the optical image stabilization at the range smaller than a predetermined amplitude and the Pan-Tilt image stabilization to make the amplitude range smaller.

Figure 6:
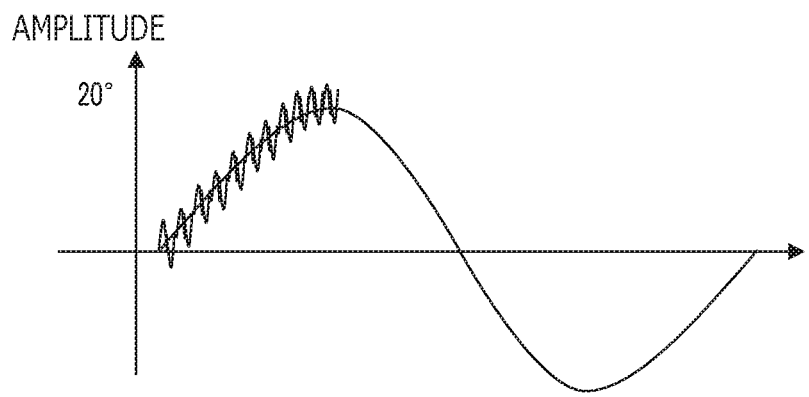
FIG. 6 is a diagram illustrating a waveform including high frequency and low frequency.

The imaging apparatus may be equipped with plural angle velocity sensors 201 shown in FIG. 2 for detecting frequencies. FIG. 6 shows a waveform including a high frequency and a low frequency. It may be possible to install an angle velocity sensor for detecting a frequency of large amplitude wave and another angle velocity sensor for detecting a frequency of small amplitude wave, and if the large amplitude wave has a low frequency, the Pan-Tilt image stabilization may be used, and if the small amplitude wave has a high frequency, the optical or the electronic image stabilization may be used to correct images.

As explained in the above, according to the present embodiment, it is possible to obtain highly effective image stabilization by changing the correction ratio of the Pan-Tilt image stabilization with combining other kinds of image stabilizations so as to exploit characteristics of the Pan-Tilt image stabilization, the optical image stabilization, and the electronic image stabilization. In addition, by inhibiting the use of the Pan-Tilt image stabilization, the power consumption can be reduced.

Second Embodiment

In the first embodiment, the correction ratio of the Pan-Tilt image stabilization is changed depending on the amplitude and the frequency of the motion, and the shutter speed. In the second embodiment, the correction ratio of the Pan-Tilt image stabilization is changed depending on the number of times that Pan-Tilt driving occurs. There is a tendency that the durability of the Pan-Tilt image stabilization mechanism is relatively lower than that of the optical image stabilization. Therefore, by changing the correction ratio of the Pan-Tilt image stabilization with taking the number of times Pan-Tilt driving occurs into consideration, the usage of the Pan-Tilt image stabilization is inhibited so that the lifetime of the Pan-Tilt image stabilization mechanism is extended. As a result, the period for performing accurate image stabilization can be extended.

Figure 7:
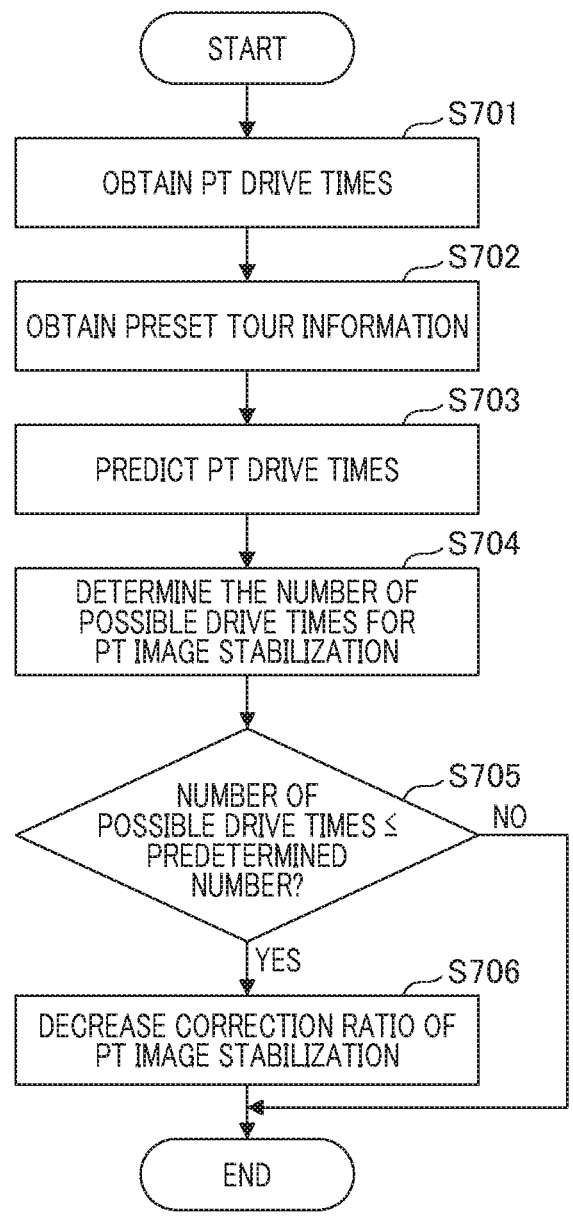
FIG. 7 is a flowchart illustrating a process for changing correction ratio of Pan-Tilt image stabilization.

The basic flow of this embodiment is the same as that of the first embodiment. In this embodiment, the processing shown in FIG. 7 is executed instead of or in addition to the processing shown in FIG. 4. FIG. 7 is a flowchart illustrating the processing for changing the correction ratio of the Pan-Tilt image stabilization depending on the number of times Pan-Tilt driving occurs.

In S701, the system control unit 103 obtains the accumulated number of times Pan-Tilt driving occurs. Here, not only the number of drive times pan or tilt direction occurs, but an amount of Pan-Tilt driving or a speed of Pan-Tilt driving may be obtained. In S702, the system control unit 103 obtains preset tour information. The preset tour is a function of security cameras to pick up images of pre-registered positions while moving to these positions in a predetermined order and at predetermined times. In S703, the system control unit 103 calculates predicted number of drive times of Pan-Tilt driving based on the preset tour information obtained in S702. Here, the predicted number of drive times of Pan-Tilt driving is the number of times the Pan-Tilt mechanism is driven by the preset tour in a predetermined period from the present point in time.

In S704, the system control unit 103 determines a possible number of drive times for the Pan-Tilt image stabilization. More specifically, the system control unit 103 calculates the number of times as the possible number of drive times for the Pan-Tilt image stabilization by subtracting the accumulated number of drive times obtained in S701 and the predicted number of drive times calculated in S703 from a prestored possible number of drive times for Pan-Tilt in the predetermined period from the present point in time. Here, as the possible number of drive times for Pan-Tilt in the predetermined period, durable times divided by the number of years to be used, or the number of times proportional or inverse proportional to years may be stored.

In S705, the system control unit 103 judges whether the possible number of drive times for the Pan-Tilt image stabilization is equal to or less than a predetermined number or not. If the possible number of drive times for the Pan-Tilt image stabilization is equal to or less than the predetermined number, the flow proceeds to S706. If the possible number of drive times for the Pan-Tilt image stabilization is more than the predetermined number, the flow in FIG. 7 ends without changing the correction ratio of the Pan-Tilt image stabilization depending on the number of drive times. In S706, the system control unit 103 decreases the correction ratio of the Pan-Tilt image stabilization.

In this flowchart, the system control unit 103 calculates the possible number of drive times for Pan-Tilt image stabilization and compares this with a predetermined number. However, the correction ratio of the Pan-Tilt image stabilization may be decreased when comparing the number of drive times obtained in S701 with a predetermined number and being decided that the number of drive times is equal to or larger than the predetermined number. Or, the correction ratio of the Pan-Tilt image stabilization may be decreased when comparing the number of times Pan-Tilt driving occurs with the number of times the optical image stabilization occurs and being decided that the number of times Pan-Tilt driving occurs is a predetermined number or more than the predetermined number larger than the number of times the optical image stabilization occurs. As mentioned in the above, by decreasing the correction ratio of the Pan-Tilt image stabilization according to the number of times the Pan-Tilt driving occurs, the durability of the Pan-Tilt mechanism can be extended.

In the first and the second embodiments, the Pan-Tilt image stabilization, the optical image stabilization, and the electronic image stabilization can be combined. Although while the Pan-Tilt image stabilization is not being utilized, a motion detected by the angle velocity sensor 201, which is means for detecting a motion, can be used by the optical image stabilization or the electronic image stabilization as it is, while the Pan-Tilt image stabilization is being utilized, depending on the position of the angle velocity sensor 201, a vibration caused by the Pan-Tilt image stabilization itself is detected during the motion is detected. Therefore, if the vibration caused by the driving of the Pan-Tilt image stabilization is affecting the motion detection, that vibration caused by the Pan-Tilt image stabilization should be subtracted from the detected motion.

Figure 8:
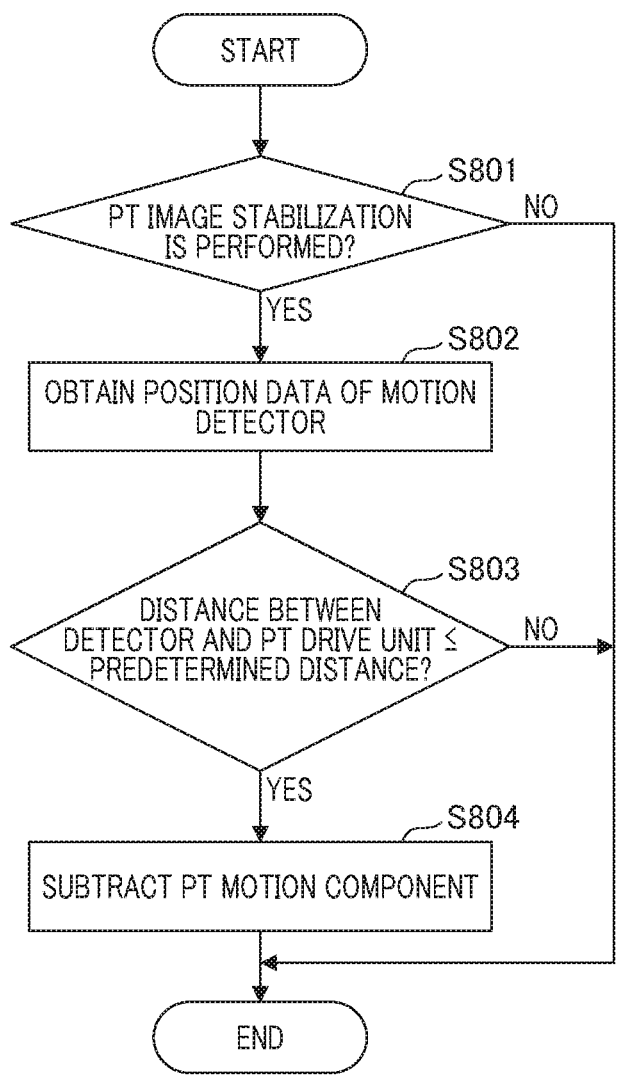
FIG. 8 is a flowchart illustrating a vibration subtraction processing of Pan-Tilt image stabilization Pan-Tilt image stabilization.

FIG. 8 is a flowchart illustrating a process to subtract the vibration caused by the Pan-Tilt image stabilization. In S801, the system control unit 103 judges whether the Pan-Tilt image stabilization is performed or not, that is, whether the vibration caused by the driving of the Pan-Tilt image stabilization mechanism is occurred or not. If the Pan-Tilt image stabilization is performed, the flow proceeds to S802, and if the Pan-Tilt image stabilization is not performed, the flow in FIG. 8 ends.

In S802, the system control unit 103 obtains a position of a detector to detect a motion. In this embodiment, the system control unit 103 obtains a position of the angle velocity sensor 201. In S803, the system control unit 103 judges whether a distance between the position of the detector and the Pan-Tilt image stabilization mechanism is equal to or less than a predetermined distance or not. In this embodiment, the Pan-Tilt image stabilization mechanism corresponds to the pan motion drive unit 105 and the tilt motion drive unit 107 in FIG. 1, and corresponds to the Pan-Tilt motor drive unit 210 and the imaging optical system 219 in FIG. 2. If the distance between the position of the detector and the Pan-Tilt image stabilization mechanism is equal to or less than the predetermined distance, the processing proceeds to S804. If the distance between the position of the detector and the Pan-Tilt image stabilization mechanism is more than the predetermined distance, the processing ends. In S804, the system control unit 103 subtracts a motion component caused by the driving of the Pan-Tilt image stabilization mechanism from a motion component detected by the detector. The optical or the electronic image stabilization is performed based on a value after the above subtraction. In connection with this, when subtracting the motion component caused by the driving of the Pan-Tilt image stabilization mechanism from a motion component detected by the detector, a ratio of subtraction may be varied according to the distance.

As explained in the above, according to the present embodiment, since the correction ratio of the Pan-Tilt image stabilization is varied by taking the number of drive times into consideration, the usage of the Pan-Tilt image stabilization mechanism is inhibited so that the lifetime of the mechanism is extended. As a result, the period for performing accurate image stabilization is extendable. In addition, because the number of drive times is inhibited, the power consumption is also saved.

Third Embodiment

The correction ratio of the Pan-Tilt image stabilization is varied according to the amplitude and the frequency of the motion and the shutter speed in the first embodiment, and according to the number of times the Pan-Tilt drive is driven in the second embodiment. In this embodiment, the correction ratio of the Pan-Tilt image stabilization is varied according to power supply sources, that is information in connection with the imaging apparatus.

Figure 9:
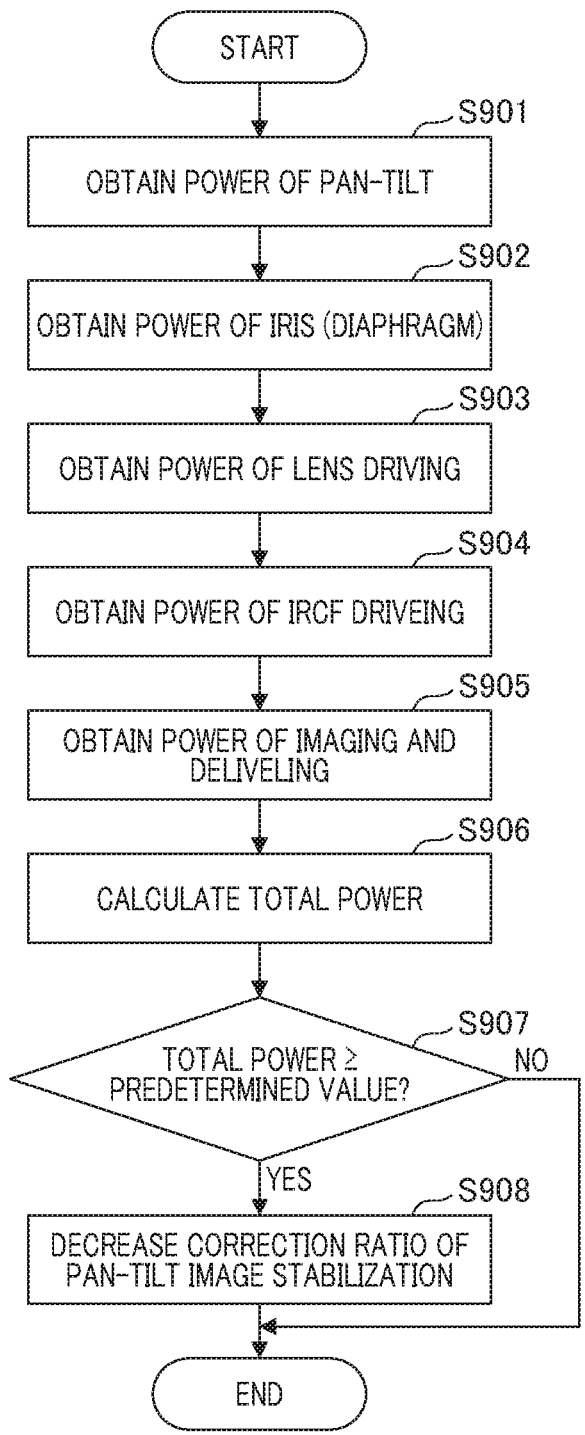
FIG. 9 is a flowchart illustrating a process for changing correction ratio of Pan-Tilt image stabilization.

FIG. 9 is a flowchart illustrating a process to change the correction ratio of the Pan-Tilt image stabilization according to power supply sources. In S901, the system control unit 103 obtains power information on driving the Pan-Tilt image stabilization mechanism. The Pan-Tilt image stabilization mechanism includes the pan motion drive unit 105 and the tilt motion drive unit 107 in FIG. 1. Note that the pan motion control unit 104 and the tilt motion control unit 106 may be included in the Pan-Tilt image stabilization mechanism.

In S902, the system control unit 103 obtains power information on driving (i.e. adjusting opening) the IRIS (i.e. diaphragm). Here, the system control unit 103 obtains power information on the IRIS drive unit 115, which may include power information on the IRIS control unit 114. In S903, the system control unit 103 obtains power information on driving the lenses, which includes power information on driving the focus lens, the zoom lens and the optical image stabilization mechanism.

In S904, the system control unit 103 obtains power information on driving (inserting/extracting) optical filters such as the IRCF (Infrared Cut Filter). Here, the system control unit 103 obtains power information on the IRCF drive unit 117, which may include power information on the IRCF insertion/extraction control unit 116. In S905, the system control unit 103 obtains power information on imaging and delivery. Here, the power on imaging and delivery includes power consumption on imaging, image processing, network signal processing, and delivering images.

This embodiment is described about a case where the power consumption is 4 Watts for driving the Pan-Tilt image stabilization mechanism, 0.5 Watt for adjusting aperture of IRIS, 2.5 Watts for driving lenses such as focusing, zooming, or the optical image stabilization, 2 Watts for insertion/retraction of IRCF, and 5 Watts for imaging and delivery.

In S906, the system control unit 103 calculates total power based on the power information obtained in S901 to S905. Assuming that the Pan-Tilt image stabilization mechanism is continuously driven, the result of calculating the total power becomes around 9 Watts summing 4 Watts for driving the Pan-Tilt image stabilization mechanism and 5 Watts for the imaging, image processing, network signal processing, and distributing images.

Although in the PoE standards, power limit for external apparatuses is 12.95 Watts at 48 Volts, considering margins including electrical loss when generating power in the apparatus and various environmental fluctuations, practically usable power should be limited to around 10 Watts. Therefore, in S907, the system control unit 103 judges whether the total power calculated in S906 is equal to or larger than a predetermined value or not. If the total power is larger than the predetermined value, the processing proceeds to S908. If the total power is smaller than the predetermined value, since this means that sufficient power is available even if the Pan-Tilt image stabilization is performed, the processing ends without decreasing the correction ratio of the Pan-Tilt image stabilization.

In S908, the system control unit 103 decreases the correction ratio (i.e. the amount of correction) of the Pan-Tilt image stabilization. The decreasing of the correction ratio of the Pan-Tilt image stabilization means that even if an angle of motion is, for example, 5 degrees, the Pan-Tilt image stabilization mechanism suppresses movements of the imaging apparatus up to 3 degrees, although in a normal situation, the Pan-Tilt image stabilization mechanism moves the imaging apparatus by 5 degrees. By suppressing the angle of movement, a drive amount of the Pan mechanism and Tilt mechanism is reduced so that power consumption is saved. Saving power consumption creates a margin with regard to the 10 Watts usable power so that stability of the driving can be secured even if the focus lens or the IRIS which is not driven at present point in time is suddenly activated.

In connection with this, when the correction angle by the Pan-Tilt image stabilization mechanism is suppressed, 2 degrees of motion of images remains without being corrected. This problem may be solved by using the optical image stabilization or the electronic image stabilization together with the Pan-Tilt image stabilization mechanism. Since power consumption for driving lenses in the optical image stabilization or power consumption for trimming images by the electronic image stabilization is much lower than that for the Pan-Tilt image stabilization mechanism, even if the optical or the electronic image stabilization is combined with the Pan-Tilt image stabilization mechanism, power consumption would still be low, and the image stabilization effect would not be deteriorated.

Figure 10:
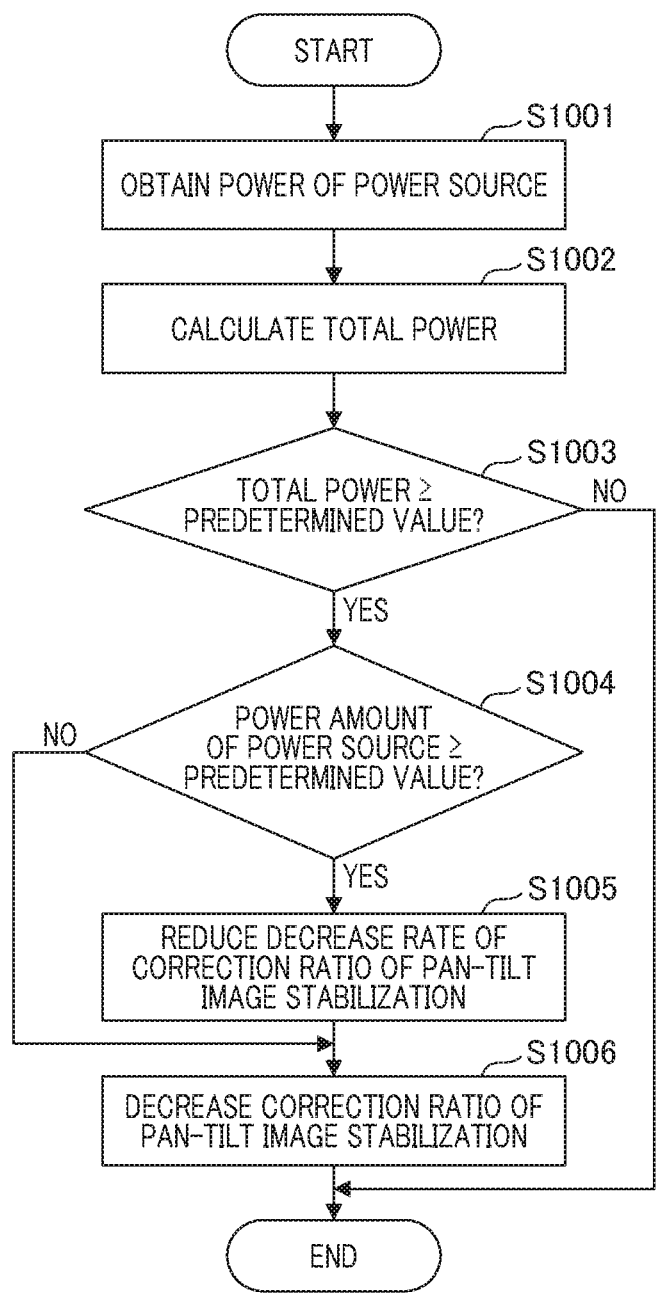
FIG. 10 is a flowchart illustrating a process for changing correction ratio of Pan-Tilt image stabilization.

Although FIG. 9 is a flowchart assuming the power source is the PoE or one kind of power source, other power sources such as PoE+ or additional power can be applicable. FIG. 10 illustrates another example of method for changing the correction ratio of the Pan-Tilt image stabilization with taking various power sources into consideration. That is, FIG. 10 is a flowchart illustrating another embodiment of a process to change the correction ratio of the Pan-Tilt image stabilization according to power sources.

In S1001, the system control unit 103 confirms the kind of power source that is connected to the imaging apparatus and obtains an amount of power supplied to the imaging apparatus. In S1002, the system control unit 103 obtains the total power that is consumed in the imaging apparatus. Here, the manner in which the total power is obtained in S1002 is the same as that illustrated in S901 to S905.

In S1003, the system control unit 103 judges whether the total power obtained in S1002 is equal to or larger than a predetermined value or not. If the total power is equal to or larger than the predetermined value, the processing proceeds to S1004, and if the total power is smaller than the predetermined value, the processing ends without changing the correction ratio of the Pan-Tilt image stabilization.

In S1004, the system control unit 103 judges whether the amount of power of the power source is equal to or larger than a predetermined value or not. If the amount of power of the power source is equal to or larger than the predetermined value, the processing proceeds to S1005, and if the amount of power of the power source is smaller than the predetermined value, the processing proceeds to S1006, and then the correction ratio of the Pan-Tilt image stabilization is reduced based on a preset decrease rate of the correction ratio of the Pan-Tilt image stabilization.

In S1005, the system control unit 103 reduces the decrease rate of the correction ratio of the Pan-Tilt image stabilization. This means that if the amount of the power of the power source is equal to or larger than the predetermined value, a margin of power increases, thereby, although the correction ratio of the Pan-Tilt image stabilization is decreased, the decrease rate of the correction ratio of the Pan-Tilt image stabilization can be reduced. For example, in the previous embodiment, the Pan-Tilt image stabilization mechanism suppresses the correction angle to 3 degrees while the angle of motion is 5 degrees, but by reducing the decrease rate of the correction ratio of the Pan-Tilt image stabilization, the correction angle becomes 4 degrees.

Therefore, when there is a margin of power depending on the power sources, the correction ratio is not set to the flat rate so that stable drive can be maintained without reducing the image stabilization performance. As explained in the above, according to the present embodiment, without significantly reducing the image stabilization performance, power consumption can be saved to create a margin of power so that stable drive of other mechanism can be realized.

Fourth Embodiment

In the third embodiment, the correction ratio of the Pan-Tilt image stabilization is changed depending on the total power and the amount of supplied power. In the fourth embodiment, the correction ratio of the Pan-Tilt image stabilization is changed depending on not only the total power but the driving of the Pan mechanism and Tilt mechanism. FIG. 11 is a flowchart illustrating the process to change the correction ratio of the Pan-Tilt image stabilization depending on the driving of the Pan mechanism and Tilt mechanism.

In S1101, the system control unit 103 calculates total power, which is performed similarly to the third embodiment. In S1102, the system control unit 103 judges whether the total power is equal to or larger than a predetermined value or not. If the total power is equal to or larger than the predetermined value, the processing proceeds to S1103. If the total power is smaller than the predetermined value, since that means there is a margin even if performing the Pan-Tilt image stabilization, the processing ends without changing the correction ratio of the Pan-Tilt image stabilization.

In S1103, the system control unit 103 judges whether the power for driving the pan motion drive unit 105 and the tilt motion drive unit 107 is equal to or larger than a predetermined value or not. If the power for driving them is equal to or larger than the predetermined value, the processing proceeds to S1104. If the power for driving them is smaller than the predetermined value, the processing proceeds to S1106 and the correction ratio of the Pan-Tilt image stabilization is decreased using a predetermined decrease rate.

In S1104, the system control unit 103 judges whether the power used for driving the Pan-Tilt image stabilization is equal to or larger than a predetermined value or not. This step is for judging whether the power used for the Pan-Tilt image stabilization accounts for large portion of the power used for driving the pan motion drive unit 105 and tilt motion drive unit 107. The pan mechanism and the tilt mechanism are used for other purposes different from the image stabilization, depending on a user operation or a predetermined periodical drive setting. If the power used for other than image stabilization accounts for large portion of the power used for driving the pan mechanism and the tilt mechanism, even if the power used for driving the Pan-Tilt image stabilization is reduced, that results in relatively a small reduction of power consumption, so that power saving effect is small. Therefore, the decrease rate of the correction ratio of the Pan-Tilt image stabilization is increased so as to bring forward power saving.

One of ways to classify the power for driving the pan mechanism and the tilt mechanism into the power for driving the Pan-Tilt image stabilization purpose and the power for other purposes is, for example, if the tilt mechanism is continuously driven, then the power is regarded to be used for the Pan-Tilt image stabilization. This is because the movement caused by the environment where the apparatus is installed is usually tilting directions. Another way to classify the purposes of the power is that if a gyro sensor is used for detecting motions, and if a gyro signal is equal to or larger than a predetermined value, the power consumed for the Pan-Tilt image stabilization may be regarded to be used for driving the Pan mechanism and Tilt mechanism.

If the power used for the Pan-Tilt image stabilization is equal to or larger than a predetermined value, the processing proceeds to S1105. If the power used for the Pan-Tilt image stabilization is smaller than the predetermined value, it is judged that a large portion of the power for driving Pan-Tilt mechanism is for purposes other than the image stabilization, and so the processing proceeds to S1106 without changing the correction ratio of the Pan-Tilt image stabilization.

In S1105, the system control unit 103 increases the decrease rate of the correction ratio of the Pan-Tilt image stabilization. That is, if the Pan-Tilt image stabilization mechanism suppresses the correction angle to 3 degrees while an angle of motion is 5 degrees, the correction angle is further suppressed to 2 degrees so that the decrease rate of the correction ratio of the Pan-Tilt image stabilization is increased and more power is saved.

As explained in the above, according to the present embodiment, instead of leaving the decrease rate of the correction ratio of the Pan-Tilt image stabilization constant, the decrease rate is increased if the power for driving the Pan-Tilt mechanism for image stabilization is relatively small. Therefore, the amount of drive of the Pan-Tilt mechanism can be reduced to save more power.

Fifth Embodiment

In the third embodiment, the correction ratio of the Pan-Tilt image stabilization is changed depending on the total power and the amount of supplied power. In the present embodiment, the correction ratio of the Pan-Tilt image stabilization is changed depending on not only the total power but the power for driving the optical image stabilization, that is information in connection with the imaging apparatus. FIG. 12 is a flowchart illustrating a process to change the correction ratio of the Pan-Tilt image stabilization depending on the optical image stabilization.

In S1201, the system control unit 103 calculates total power. In S1202, the system control unit 103 judges whether the total power calculated in S1201 is equal to or larger than a predetermined value or not. Here, S1201 and S1202 are respectively the same steps as S1101 and S1102. If the total power is equal to or larger than the predetermined value, the processing proceeds to S1203, while if the total power is smaller than the predetermined value, since that means there is a margin when performing the Pan-Tilt image stabilization, the processing ends without changing the correction ratio of the Pan-Tilt image stabilization.

In S1203, the system control unit 103 compares the power consumed by the Pan-Tilt image stabilization, which uses the pan mechanism and the tilt mechanism, with the power consumed by the optical image stabilization. If the ratio of the power consumed by the Pan-Tilt image stabilization to the power consumed by the optical image stabilization is equal to or larger than a predetermined ratio, the processing proceeds to S1204, while if the ratio of the power consumed by the Pan-Tilt image stabilization to the power consumed by the optical image stabilization is smaller by the predetermined ratio, the processing proceeds to S1205.

In S1204, the system control unit 103 increases the decrease rate of the correction ratio of the Pan-Tilt image stabilization. In S1205, the system control unit 103 decreases the correction ratio (i.e. amount of correction) of the Pan-Tilt image stabilization. In connection with this, in the above embodiment, although the system control unit 103 compares the power consumed by the Pan-Tilt image stabilization with the power consumed only by the optical image stabilization, the system control unit 103 may compare the power consumed by the Pan-Tilt image stabilization with the power consumed not only by the optical image stabilization but also by the electronic image stabilization.

As explained in the above, according to the present embodiment, if the ratio of the power consumed by the Pan-Tilt image stabilization to the power consumed by the optical image stabilization is equal to or larger than the predetermined ratio, the decrease rate of the correction ratio of the Pan-Tilt image stabilization is increased so that power consumption can be reduced. In connection with this, apart from the method explained in the above, it may be possible to change the decrease rate of the correction ratio of the Pan-Tilt image stabilization according to the drive speed or drive direction of the pan mechanism and tilt mechanism.

Other Embodiments

The present invention can be realized in processes in which a program that executes one or more functions of the above embodiment is supplied to a system or a device through a network or a storage medium, and one or more processors in a computer of the system or the device read and execute the program. In addition, the present invention can be realized by a circuit (for example, an ASIC) that implements one or more functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-224597, filed Nov. 22, 2017, which is hereby incorporated by reference wherein in its entirety.

What is claimed is:

1. An imaging apparatus comprising:
at least one processor or circuit programmed to function as:
a drive unit configured to perform a pan driving and a tilt driving of an optical imaging system including lenses and an image sensor;
a control unit configured to control a correction amount of image stabilization using at least one of the pan driving and the tilt driving to correct an image motion; and
wherein the control unit changes the correction amount depending on total power of the imaging apparatus, and
wherein the control unit makes the correction amount at a time when the total power is equal to or larger than the predetermined value lower than the correction amount at a time when the total power is smaller than the predetermined value.

2. The imaging apparatus according to claim 1, wherein the control unit changes a decrease rate of the correction amount depending on power supplied to the imaging apparatus or power consumed by the drive unit when the total power is greater than the predetermined value and the control unit decreases the correction amount.

3. The imaging apparatus according to claim 2, wherein the control unit makes the decrease rate of the correction amount at a time when the power supplied to the imaging apparatus is equal to or larger than the predetermined value lower than the decrease date of correction amount at a time when the power supplied to the imaging apparatus is smaller than the predetermined value.

4. The imaging apparatus according to claim 2, wherein the control unit makes the decrease rate of the correction amount at a time when the power consumed by the drive unit is equal to or larger than the predetermined value higher than the decrease rate of the correction amount at a time when the power consumed by the drive unit is smaller than the predetermined value.

5. The imaging apparatus according to claim 2, wherein the control unit compares power for stabilizing images by driving the drive unit with power for stabilizing images not by driving the drive unit, and the control unit makes the decrease rate of the correction amount at a time when the power for stabilizing images by driving the drive unit is equal to or larger than the predetermined rate higher than the decrease rate of the correction amount at a time when the power for stabilizing images by driving the drive unit is smaller than the predetermined rate.

6. The imaging apparatus according to claim 1, further comprising; a first image stabilization unit configured to stabilize images by driving the drive unit; and
at least one of a second image stabilization unit configured to optically stabilize images by driving a shift lens included in the optical imaging system or a third image stabilization unit configured to electronically stabilize images.

7. The imaging apparatus according to claim 1, wherein the control unit changes the correction amount according to at least one among an amplitude of a motion, a frequency of the motion, a shutter speed, and number of drive times of the drive unit.

8. The imaging apparatus according to claim 7, wherein the control unit makes the correction amount at a time when the amplitude of the motion is less than the predetermined amplitude smaller than the correction amount at a time when the amplitude of the motion is equal to or more than the predetermined amplitude.

9. The imaging apparatus according to claim 8, wherein;
the control unit makes the correction amount at a time when the amplitude of the motion is equal to or more than the predetermined amplitude larger than the correction amount at a time when the amplitude of the motion is less than the predetermined amplitude, and
the control unit makes an increase rate of the correction amount at a time when the zoom ratio is less than the predetermined ratio lower than the increase rate of the correction amount at a time when the zoom ratio is equal to or more than the predetermined ratio.

10. The imaging apparatus according to claim 7, wherein the control unit makes the correction amount at a time when the shutter speed is equal to or higher than the predetermined speed less than the correction amount at a time when the shutter speed is lower than the predetermined speed.

11. The imaging apparatus according to claim 7, wherein the control unit makes the correction amount at a time when the number of drive times is equal to or larger than the predetermined number more than the correction amount at a time when the number of drive times is smaller than the predetermined number.

12. A control method for controlling an imaging apparatus to perform a pan driving and a tilt driving of an optical imaging system including lenses and an image sensor, comprising:
controlling a correction amount of image stabilization using at least one of the pan driving and the tilt driving to correct an image motion; and
wherein the controlling changing the correction amount depending on total power of the imaging apparatus, and
wherein the controlling makes the correction amount at a time when the total power is equal to or larger than the predetermined value lower than the correction amount at a time when the total power is smaller than the predetermined value.

13. An imaging apparatus comprising:
at least one processor or circuit programmed to function as:
a drive unit configured to perform a pan driving and a tilt driving of an optical imaging system including lenses and an image sensor;
a control unit configured to control a correction amount of image stabilization using at least one of the pan driving and the tilt driving to correct an image motion; and
wherein the control unit is configured to change the correction amount according to information related to the imaging apparatus, and
wherein the control unit makes the correction amount at a time when a frequency of the motion is equal to or higher than a predetermined frequency less than the correction amount at a time when the frequency of the motion is smaller than the predetermined frequency.

14. The imaging apparatus according to claim 13, wherein;
the control unit makes the correction amount at a time when the frequency of the motion is lower than the predetermined frequency larger than the correction amount at a time when the frequency of the motion is equal to or larger than the predetermined frequency, and
the control unit makes an increase rate of the correction amount at a time when the zoom ratio is lower than the predetermined ratio smaller than the increase rate of the correction amount at a time when the zoom ratio is equal to or larger than the predetermined ratio.

15. An imaging apparatus comprising:
at least one processor or circuit programmed to function as:
a drive unit configured to perform a pan driving and a tilt driving of an optical imaging system including lenses and an image sensor;
a control unit configured to control a correction amount of image stabilization using at least one of the pan driving and the tilt driving to correct an image motion; and
wherein the control unit is configured to change the correction amount according to information related to the imaging apparatus,
wherein the control unit makes the correction amount at a time when a shutter speed is equal to or higher than a predetermined speed less than the correction amount at a time when the shutter speed is lower than the predetermined speed,
wherein the control unit makes the correction amount at a time when the shutter speed is lower than the predetermined speed larger than the correction amount at a time when the shutter speed is equal to or higher than the predetermined speed, and
wherein the control unit makes an increase rate of the correction amount at a time when a zoom ratio is lower than a predetermined ratio smaller than the increase rate of the correction amount at a time when the zoom ratio is equal to or higher than the predetermined ratio.

16. An imaging apparatus comprising:
at least one processor or circuit programmed to function as:
a drive unit configured to perform a pan driving and a tilt driving of an optical imaging system including lenses and an image sensor;
a control unit configured to control a correction amount of image stabilization using at least one of the pan driving and the tilt driving to correct an image motion; and
wherein the control unit is configured to change the correction amount according to information related to the imaging apparatus,
wherein the number of possible drive times of the drive unit for image stabilization is calculated based on the number of the drive times of the drive unit up to the present point in time and a predicted number of the drive times in future, and
wherein the control unit makes the correction amount at a time when the number of possible drive times of the drive unit for image stabilization is equal to or less than a predetermined number smaller than the correction amount at a time when the number of possible drive times of the drive unit for image stabilization is more than a predetermined number.

17. A control method for controlling an imaging apparatus to perform a pan driving and a tilt driving of an optical imaging system including lenses and an image sensor by a drive unit, comprising:

controlling a correction amount of image stabilization using at least one of the pan driving and the tilt driving to correct an image motion; and wherein the controlling includes changing the correction amount according to information related to the imaging apparatus, and wherein the controlling makes the correction amount at a time when a frequency of the motion is equal to or higher than the predetermined frequency less than the correction amount at a time when the frequency of the motion is smaller than the predetermined frequency.

18. A control method for controlling an imaging apparatus to perform a pan driving and a tilt driving of an optical imaging system including lenses and an image sensor, comprising:

controlling a correction amount of image stabilization using at least one of the pan driving and the tilt driving to correct an image motion; and wherein the controlling includes changing the correction amount according to information related to the imaging apparatus, wherein the controlling makes the correction amount at a time when a shutter speed is equal to or higher than a predetermined speed less than the correction amount at a time when the shutter speed is lower than the predetermined speed, wherein the controlling makes the correction amount at a time when the shutter speed is lower than the predetermined speed larger than the correction amount at a time when the shutter speed is equal to or higher than the predetermined speed, and wherein the controlling makes an increase rate of the correction amount at a time when a zoom ratio is lower than a predetermined ratio smaller than the increase rate of the correction amount at a time when the zoom ratio is equal to or higher than the predetermined ratio.

19. A control method for controlling an imaging apparatus to perform a pan driving and a tilt driving of an optical imaging system including lenses and an image sensor, comprising:

controlling a correction amount of image stabilization using at least one of the pan driving and the tilt driving to correct an image motion; and wherein the controlling includes changing the correction amount according to information related to the imaging apparatus, wherein the number of possible drive times of the drive unit for image stabilization is calculated based on the number of the drive times of the drive unit up to the present point in time and a predicted number of the drive times in future, and wherein the controlling makes the correction amount at a time when the number of possible drive times of the drive unit for image stabilization is equal to or less than a predetermined number smaller than the correction amount at a time when the number of possible drive times of the drive unit for image stabilization is more than a predetermined number.

* * * * *